(12) United States Patent
Poole

(10) Patent No.: US 7,379,062 B2
(45) Date of Patent: May 27, 2008

(54) METHOD FOR DETERMINING A PATH ALONG A BIOLOGICAL OBJECT WITH A LUMEN

(75) Inventor: Ian Poole, Edinburgh (GB)

(73) Assignee: Barco NV, Kortrijk (BE)

( * ) Notice: Subject to any disclaimer, the term of this patent is extended or adjusted under 35 U.S.C. 154(b) by 167 days.

(21) Appl. No.: 11/194,516

(22) Filed: Aug. 1, 2005

(65) Prior Publication Data

US 2007/0024617 A1    Feb. 1, 2007

(51) Int. Cl.
*G06T 17/00* (2006.01)
*G06K 9/00* (2006.01)
*A61B 6/00* (2006.01)

(52) U.S. Cl. ............... 345/424; 382/128; 382/130; 382/131; 382/132; 600/431

(58) Field of Classification Search ........ 382/128–132; 345/424

See application file for complete search history.

(56) References Cited

U.S. PATENT DOCUMENTS

| | | | |
|---|---|---|---|
| 5,611,025 A | 3/1997 | Lorensen et al. | |
| 5,971,767 A | 10/1999 | Kaufman et al. | |
| 6,343,936 B1 | 2/2002 | Kaufman et al. | |
| 6,496,188 B1 | 12/2002 | Deschamps et al. | |
| 6,690,816 B2 | 2/2004 | Aylward et al. | |
| 7,081,088 B2 * | 7/2006 | Geiger | 600/103 |
| 7,167,180 B1 * | 1/2007 | Shibolet | 345/474 |
| 2001/0031920 A1 * | 10/2001 | Kaufman et al. | 600/431 |
| 2002/0193687 A1 * | 12/2002 | Vining et al. | 600/425 |
| 2003/0199762 A1 * | 10/2003 | Fritz et al. | 600/437 |

(Continued)

FOREIGN PATENT DOCUMENTS

WO    03/058553    7/2003

(Continued)

OTHER PUBLICATIONS

Dijkstra, E.W. "A Note on Two Problems in Connexion with Graphs." *Numerische Mathematik.* 1 (1959): 269-271.

(Continued)

*Primary Examiner*—Mark Zimmerman
*Assistant Examiner*—Crystal Murdoch
(74) *Attorney, Agent, or Firm*—Renner, Otto, Boisselle & Sklar, LLP.

(57) ABSTRACT

A path between specified start and end voxels along a biological object with a lumen, such as a vessel, within a patient image three-dimensional volume data set comprising an array of voxels of varying value is identified using an algorithm that works outwards from the start voxel to identify paths of low cost via intermediate voxels. The intermediate voxels are queued for further expansion of the path using a priority function comprising the sum of the cost of the path already found from the start voxel to the intermediate voxel and the Euclidean distance from the intermediate voxel to the end voxel. A cost function that depends on the voxel density is used to bias the algorithm towards paths inside the object. The number of iterations of the voxel required to find a path from the start to the end voxel, and hence the time taken, can be significantly reduced by scaling the Euclidean distance by a constant. Usefully, the constant is greater than 1, such as between 1.5 and 2.

13 Claims, 3 Drawing Sheets

U.S. PATENT DOCUMENTS

| | | |
|---|---|---|
| 2004/0024315 A1* | 2/2004 | Chalana et al. ............ 600/443 |
| 2004/0109603 A1 | 6/2004 | Bitter et al. |
| 2004/0209234 A1* | 10/2004 | Geiger ...................... 434/262 |
| 2005/0033114 A1 | 2/2005 | Geiger et al. |
| 2005/0064483 A1* | 3/2005 | Zang et al. .................... 435/6 |
| 2005/0169507 A1* | 8/2005 | Kreeger et al. ............ 382/128 |
| 2006/0047421 A1* | 3/2006 | Goldberg et al. ........... 701/209 |
| 2006/0062450 A1* | 3/2006 | Yoakum-Stover et al. ... 382/154 |
| 2006/0094951 A1* | 5/2006 | Dean et al. ................ 600/407 |
| 2006/0204953 A1* | 9/2006 | Ptitsyn .......................... 435/4 |

FOREIGN PATENT DOCUMENTS

| | | |
|---|---|---|
| WO | 2005/069223 | 7/2005 |

OTHER PUBLICATIONS

Kanistar, A.M. "Advanced Visualisation Techniques for Vessel Investigation." *Master's Thesis, Technical University of Vienna, Institute for Computer Graphics and Algorithms*. Chapter 5 (2001): 40-46.

Kanistar, A.M. et al. "Postprocessing and Visualization of Peripheral CTA Data in Clinical Environments." *Central European Seminar on Computer Graphics for Students*. (2001): 39-48.

Mortensen, Eric N. et al. "Interactive Segmentation with Intelligent Scissors." *Graphical Models and Image Processing*. 60 (Sep. 1998): 349-384.

Sadleir, Robert J.T. et al. "Colon Centerline Calculation for CT Colonography Using Optimised 3D Topological Thinning." *3DPVT 2002—The International Symposium on 3D Data Processing Visualization and Transmission*. Padova, Italy (Jun. 19-21, 2002).

Wink O et al: "3D MRA Conary Axis Determination Using a Minimum Cost Path Approach" Magnetic Resonance, Academic Press, Duluth, MN US, vol. 47, No. 6, Jun. 2002, pp. 1169-1175, XP001170393.

Brian B. Avants and James P. Williams: "An Adaptive Minimal Path Generation Technique for Vessel Tracking in CTA/CE-MRA Volume Images" 2000, S.L. Delp, A.M. Digioia and B. Jaramaz, (EDS): MICCAI 2000, LNCS 1935, pp. 707-716; Springer-Verlag Berlin-Heidelberg, XP019001317.

Felkel P; Wegenkittl R; Kanistar A: "Vessel tracking in peripheral CTA datasets-an overview" 2001, Proceedings Spring Conference on Computer Graphics- 2001 IEEE Comput. Soc, Los Alamitos, CA, USA, XP 002405741.

* cited by examiner

METHOD FOR DETERMINING A PATH ALONG A BIOLOGICAL OBJECT WITH A LUMEN

BACKGROUND OF THE INVENTION

The present invention relates to a method for determining a path, which may be a centerline path, along a biological object having a lumen that is included in a three-dimensional volume data set representing a biological object.

Patient imaging methods such as computer-assisted tomography (CT), magnetic resonance imaging (MRI), ultrasound and positron-emission tomography (PET) generate large three-dimensional volume data sets representing all or part of a patient's body. These volume data sets are highly detailed and allow complex studies of the body to be made. Advanced image processing techniques enhance the utility of the visualization of these data sets. For example, a physician may use a three-dimensional data set of an artery to determine the extent of stenosis or to plan the stenting of an aneurysm. This requires accurate identification of the centerline path along the lumen and measurements associated with the anatomy and physiology. Other applications may also require a path to be identified, including direct medical applications such as determining the exact location of a tumor or polyp to be operated on in an organ such as the colon or lungs, or medical imaging techniques such as virtual endoscopy and curved multi-planar reformatting (MPR).

A number of methods have been proposed for calculating such paths. Important criteria include speed and simplicity of computation, and keeping the path away from the object wall or from straying out of the object altogether. It is not generally trivial to satisfy all these criteria, and the previously proposed methods are many and varied. The methods include those based on mathematical techniques designed for vessel wall avoidance [1, 2, 3]; and those based on mathematical techniques that use erosion to determine a central line or medial axis along the vessel [4, 5], or that use 3D topological thinning to find the centerline [6]. Other techniques include labeling points in the data set with their distance from the end of the path using a wavefront technique to avoid obstacles and calculating the path by moving from point to point according to the closest distance to the end point [7]; convolution filtering to approximate a central track [8]; defining a cube around the region of interest and using the intersections of a region grown out from the current camera position with the cube to calculate centerlines from the camera to the intersections and selecting the best centerline [9]; and obtaining an initial path by using a distance label map to connect start and end voxels via intermediate voxels according to their distance from the start and end voxels, and centering the path using spheres [10].

Some methods make use of Dijkstra's algorithm. This is an algorithm that finds the minimum path length (or shortest path) between two points or nodes in a network made up of a plurality of nodes, some or all pairs of which are connected by a path or branch, the branches having known lengths [11]. A three-dimensional volume data set is made up of an array of voxels arranged regularly in three dimensions, each voxel having a value related to a physical attribute of the material represented by that voxel. The distances between the voxels are known, so Dijkstra's algorithm can be applied by considering each voxel to be a node in a network, the nodes connected to the adjacent nodes.

For lumen path finding, it is important that the path stays within the lumen from the start to the end of the path. A path that does this is not necessarily the shortest path through the data set between the start and end points, so Dijkstra's algorithm needs to be constrained to find a path within the lumen. Kanitsar [12, 13] proposes to do this for a network of blood vessels by replacing the branch length by a cost function for each pair of voxels. The cost function is the distance between the two voxels weighted by factors that give a low cost to paths lying within the vessel and a high cost to paths partially or wholly outside the vessel. The algorithm then seeks the path with the lowest cost rather than the shortest distance.

A start point for the path is selected, and Dijkstra's algorithm calculates the minimum cost path from the start point to all points in the data set. In practice the algorithm can stop when the minimum cost path to a desired end point is found. The algorithm operates by computing the paths from the start point to other nodes (voxels) in an expanding frontier "shell". The shell expands in contours of approximately equal cost, with minimum cost paths then available between the start point and any point inside the shell. An advantage of this approach is that once a path from the start point to a first end point has been found, a further path from the start point to a second end point can be delivered quickly, even at interactive speed. If the second end point is already in the computed shell, the optimal path to that point can be provided immediately; if it is not, the calculation can be continued re-using existing results and expanding the shell further until it reaches the second end point. This computational re-usage can be valuable.

However, a disadvantage of Dijkstra's algorithm is that the computation overall can be very slow. The algorithm does not make direct use of the desired end point of the path so to reach the end point it must expand the shell of known paths in all directions, even those leading in the opposite direction to the end point. In the context of lumen path finding for applications such as stent planning and stenosis sizing, this is a serious problem that can result in execution times of several tens of seconds in many cases, which users tend to find unacceptably slow.

SUMMARY OF THE INVENTION

Accordingly, a first aspect of the present invention is directed to a computer-implemented method of determining a path along a three-dimensional object represented by a three-dimensional volume data set, the data set comprising a plurality of voxels each having a value indicating a characteristic of material represented by the voxel and arranged in a three-dimensional array, the method comprising: selecting a path start voxel s and a path end voxel e from voxels lying within the object; and determining a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than zero.

This path finding method thus operates by taking account of the closeness of a candidate voxel to the end point of the path. The effect of this is to greatly reduce the time taken to identify a path between desired start and end points because far less computation is wasted exploring paths that lead away from the end point, compared to path finding techniques such as that proposed by Kanitsar [12, 13]. This advantageous development has been made possible by the recognition by the inventors of the present invention that a patient image three-dimensional volume data set composed of an array of voxels can be treated as a Euclidean network. In a preferred embodiment, the minimum cost path finding algorithm is a modified version of Dijkstra's algorithm.

Various embodiments of the method can be utilised by selecting the value of the constant k in the priority function. The following values of k are meaningful in the context that the cost of a path between two voxels is greater than or equal to the distance between those two voxels in any chosen units. For example, one may chose $0<k\leq1$, or $k=1$. In the case of a modified Dijkstra's algorithm, this regime allows the algorithm to find the lowest cost path along the object between the selected start and end voxels but much more quickly than if the Euclidean distance is not used in the prioritising (in other words, if $k=0$, which is Dijkstra's standard algorithm). The reduction in processing time is highly valuable for many patient image processing applications, such as stent planning and stenosis sizing, in which a real-time user experience is appreciated and possibly demanded.

Alternatively, one may chose $k>1$. Again considering the modified Dijkstra's algorithm, the effect of increasing k above unity is to introduce an error into the identified path, in that the path is no longer the shortest path from the start voxel to the end voxel. This error is often of no consequence, since for many applications any path through the object is as useful as the lowest cost path. Importantly, though, the error is accompanied by a further substantial reduction in algorithm processing time (the number of iterations needed to find the path is much smaller), which is extremely useful.

Although any value of k in excess of unity offers this advantage, a useful regime is $1.5\leq k\leq2$, for example, $k=2$. This gives an exceptional shortening of the processing time that is adequate for many applications as far as user demands are concerned, in conjunction with a path cost error that is insignificant in many cases.

The priority function p for a voxel n may be given by $p(n)=c(s,n)+k(d(n,e))$ where: $c(s,n)$ is the lowest cost for a path from the start voxel s to the voxel n according to a cost function that defines costs for paths between pairs of adjacent voxel; $d(n,e)$ is the Euclidean distance from the voxel n to the end voxel e; $c(s,n)\geq d(n,e)$; and a low value of p corresponds to a high priority. Path costs are used by the path finding algorithm to choose between different options for the path, i.e. to make the selection of intermediate voxels n. Most simply, the cost can correspond only to path distance, so that the shortest path is found. More usefully in the context of biological object (vessel or lumen, for example) path finding, where the shortest path between the start and end voxels may well not follow the object, the cost can be chosen to bias the path towards the object interior.

For example, the cost function may depend on the voxel value and may give a lower cost for a path between a pair of voxels in which both voxels lie within the object, and a higher cost for a path between a pair of voxels in which one or both voxels lie outside the biological object. By using an algorithm that prefers a low cost path, a cost function of this type in combination with the weighted Euclidean distance gives high priority to voxels that are both within the object and close to the end voxel.

Alternatively, the voxels outside the object may not be prioritized for possible selection by the algorithm. Thus, the algorithm only considers voxels inside the object for potential inclusion in the path, and ignores all voxels outside the object. This also acts to confine the path to the inside of the object.

In some embodiments, selecting the intermediate voxels n may comprise: (i) using the cost function to ascertain costs for paths from the start voxel s to adjacent voxels; (ii) prioritizing the voxels to which paths have been costed using the priority function; (iii) selecting from the prioritized voxels the voxel with the highest priority; (iv) using the cost function to ascertain costs for paths from the start voxel s via the voxel with the highest priority to voxels adjacent to the voxel with the highest priority; and (v) repeating (ii) to (iv) until a path is costed from the start voxel s to the end voxel e. These steps correspond to Dijkstra's algorithm for finding the shortest or lowest cost path between two points. The addition of the Euclidean distance to the priority function according to the present invention gives a modified version of Dijkstra's algorithm.

It may be desirable that the path follows the centerline of the object. The method may thus further comprise refining the path determined from the start voxel s to the end voxel e towards the longitudinal axis of the object. Many techniques are known for achieving such path refinement, including various methods that analyze images sampled orthogonal to the determined path. A requirement for this additional stage highlights the benefit of using $k>1$ to further reduce computation; the error in the path away from the lowest cost path that arises from increasing the value of k is irrelevant if the path is to be subsequently adjusted to the centerline.

Also, the method may further comprise smoothing the path determined from the start voxel s to the end voxel e. Depending on the application, the smoothing may be performed alone, or before or after the above-mentioned path refining.

In some embodiments, the object is a biological object with a lumen. In the context of biological objects, the object may be a blood vessel or network of blood vessels, a colon, or a bronchial tree; these examples are not limiting and the term object is intended to include all biological objects, particularly those with lumens. Indeed, non-biological objects are also suitable, including tubular objects, and for biological or non-biological objects, the object may or may not be branched.

A second aspect of the present invention is directed to a computer program product comprising machine-readable instructions for implementing a computer-implemented method of determining a path along a three-dimensional object represented by a three-dimensional volume data set, the data set comprising a plurality of voxels each having a value indicating a characteristic of material represented by the voxel and arranged in a three-dimensional array, the instructions being operable to instruct a machine to: store a three-dimensional volume data set; allow a user to select a path start voxel s and a path end voxel e from voxels lying within the object; and determine a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than zero. The computer program product may comprise a computer program on a carrier medium. For example, the carrier medium may be a storage medium or a transmission medium.

A third aspect of the present invention is directed to a computer system for implementing a computer-implemented method of determining a path along a three-dimensional object represented by a three-dimensional volume data set, the data set comprising a plurality of voxels each having a value indicating a characteristic of material represented by the voxel and arranged in a three-dimensional array, the computer system comprising: memory for storing a three-dimensional volume data set; and a processor programmed to: allow a user to select a path start voxel s and a path end voxel e from voxels lying within the object; and determine a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than zero.

The processor may be further programmed to refine the path determined from the start voxel s to the end voxel e towards the longitudinal axis of the vessel, and/or to smooth the path determined from the start voxel s to the end voxel e.

A fourth aspect of the present invention is directed to a computer-implemented method of determining a path along a biological vessel represented by a three-dimensional volume data set, the data set comprising a plurality of voxels each having a density value and arranged in a three-dimensional array, the method comprising: providing a cost function that defines costs for paths between pairs of adjacent voxels, where the cost function depends on the voxel density value and gives a lower cost for a pair of voxels in which both voxels lie within the biological vessel than for a pair of voxels in which one or both voxels lie outside the biological vessel; selecting a path start voxel s and a path end voxel e; and determining a path from the start voxel s to the end voxel e via one or more intermediate voxels n by: (i) using the cost function to ascertain costs for paths from the start voxel s to adjacent voxels; (ii) prioritising the voxels to which paths have been costed using a priority function; (iii) selecting from the prioritised voxels the voxel or voxels with the highest priority; (iv) using the cost function to ascertain costs for paths from the start voxel s via the voxel or voxels with the highest priority to voxels adjacent to the voxel or voxels with the highest priority; (v) repeating (ii) to (iv) until a path is costed from the start voxel s to the end voxel e; wherein the priority function p for a voxel n is given by $p(n)=c(s,n)+k(d(n,e))$ where $c(s,n)$ is the lowest cost for a path from the start voxel s to the voxel n, $d(n,e)$ is the Euclidean distance from the voxel n to the end voxel e, and k is a constant greater than zero; and a low value of p corresponds to a high priority.

A fifth aspect of the present invention is directed to a computer-implemented method of determining a path along a biological vessel represented by a three-dimensional volume data set, the data set comprising a plurality of voxels each having a density value and arranged in a three-dimensional array, the method comprising: providing a cost function that defines costs for paths between pairs of adjacent voxels, where the cost function depends on the voxel density value and gives a lower cost for a pair of voxels in which both voxels lie within the biological vessel than for a pair of voxels in which one or both voxels lie outside the biological vessel; selecting a path start voxel s and a path end voxel e; and determining a path from the start voxel s to the end voxel e via one or more intermediate voxels n using a modified version of Dijkstra's algorithm, wherein the modification comprises prioritising the intermediate voxels n for processing by the algorithm using a priority function p for a voxel n given by $p(n)=c(s,n)+k(d(n,e))$ where $c(s,n)$ is the lowest cost for a path from the start voxel s to the voxel n according to the cost function, $d(n,e)$ is the Euclidean distance from the voxel n to the end voxel e, and k is a constant greater than zero; and a low value of p corresponds to a high priority.

Other examples and embodiments are set out in the accompanying claims.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
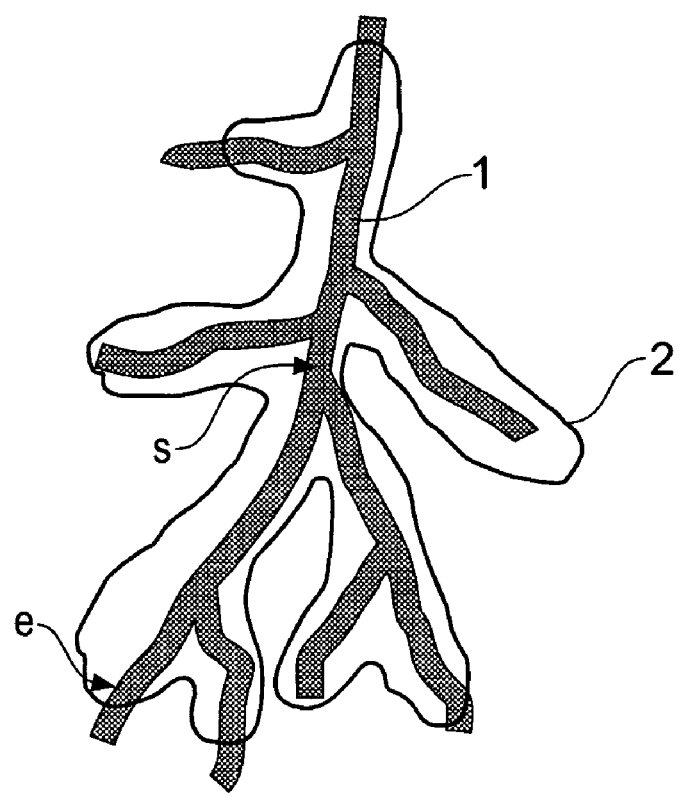
FIG. 1 shows a schematic representation of a biological object network through which a path has been determined using a prior art method.

Medical imaging techniques such as computer-assisted tomography (CT), magnetic resonance imaging (MRI), ultrasound and positron-emission tomography (PET) produce large sets of data representing all or part of a patient's body. The data are typically collected in slices or layers through the patient's body, which are then assembled into a three-dimensional volume data set. The data set comprises a plurality of volume elements or voxels, arranged in a regular three-dimensional array. Each voxel has a value (for example, Hounsfield units in CT images) that indicates the characteristics of the tissue in the corresponding part of the patient. Thus, voxels representing bone will have different values from voxels representing organs or muscles. The type of value depends on the imaging system used because different systems measure different characteristics of materials. Examples include density and opacity. Volume rendering or other image processing methods can be used to generate two- and three-dimensional images of the patient; these can be viewed from points inside the data set.

Locating anatomy and pathology and measuring their dimensions accurately is of particular importance in medical diagnosis and treatment. For example, the determination of location and extent of a blood vessel stenosis or of the dimensions of a stent to most effectively treat an aneurysm is a non-trivial problem. The use of three-dimensional data imaging techniques coupled with advanced imaging analysis is particularly useful in tasks such as this. Both tasks require accurate identification of vessel dimensions through path finding or an equivalent technique. Any data processing should desirably be very fast so as to deliver an acceptable real-time interaction to the user.

As discussed in the introduction, Dijkstra's algorithm has been proposed as a method for calculating a suitable path through a biological object with a lumen (such as a vessel) [12, 13]. Dijkstra's algorithm is applicable to any network (graph) of nodes connected by branches of known cost. Beginning from any designated start node, the algorithm calculates the lowest cost path from the start node to all other nodes in the network. It operates by determining the cost of paths from the start node to adjacent nodes, seeing which node or nodes have the lowest cost path and determining the cost from those nodes to their adjacent nodes, again seeing which nodes have the lowest cost paths from the start node out of all the paths determined so far, including the first set of paths, determining the cost from those nodes to their adjacent nodes, and so on. Thus, the algorithm spreads outwards from the start node in an expanding shell, where the nodes on the outside of the shell at any time have approximately the same path cost from the start node. For any node inside the shell, the lowest cost path from the start node to that node has already been determined.

In the context of path finding for stent planning and stenosis sizing (and other lumen path finding applications), the voxels in the three-dimensional data set comprise the nodes in the network, and each is considered to be connected via branches to either six adjacent voxels by six branches (horizontal and vertical connectivity only) or to twenty-six adjacent voxels by twenty-six branches (horizontal, vertical and diagonal connectivity). Clearly, for a useful path to be found, the algorithm needs to be constrained to follow paths from voxel to voxel that lie within the lumen of interest, otherwise the shell will just spread out in all directions from the start node and will probably reach the desired end point via a path that passes straight through any intervening tissue.

To address this, the branch costs are defined by a function that reflects the likelihood of a branch lying within the lumen, with branches connecting voxels inside the lumen having a low cost, and branches connecting voxels outside the lumen or connecting voxels inside the lumen to voxels outside the lumen having a high cost.

The branch cost can be specified using a cost function $f_C(x,y)$ for two adjacent voxels x and y. Kanitsar [12, 13] proposes a particular form of $f_C(x,y)$ involving the voxel values at x and y and their first and second spatial derivatives.

Once the cost functions for each pair of adjacent voxels are specified, Dijkstra's algorithm is applied directly using the desired starting point of the path through the lumen as the start node. In Kanitsar's method the algorithm is allowed to run until the shell expands out to encompass a node corresponding to the desired end point of the path. The shortest path from the start to the end point that lies within the lumen has then been found. The cost function operates to bias the algorithm away from paths that lead out of the lumen, so that the minimum cost path between the desired start and end points will remain inside the lumen.

Note that although the end point is specified so that the algorithm will stop when the expanding shell reaches it, the algorithm makes no reference to the end point when selecting which nodes to expand out from. The consequence of this is that, within the confines of the lumen, the algorithm investigates paths in all directions, even those opposite to the end point. This means that there is wasted computation in the process of identifying a path from the start to the end point, which slows the process, giving delays that may be unacceptable to the user.

FIG. 1 illustrates this problem. A network of vessels 1 is depicted, within which are specified a path start point s and a path end point e. The outer contour 2 indicates the extent of the space that will be explored, working outwards from s, before the shell of known paths expands to encompass e. Clearly, much of this computation is wasted; many paths are explored that lead from s away from e and cannot possibly be the first part of the lowest cost path to e. The problem is in fact more severe than FIG. 1 suggests, since while the algorithm is exploring uninteresting parts of the vessel network, it is possible, and indeed quite common, for the path to leak into bone (which in CT has a similar density to contrast-enhanced vessels), thus increasing further the volume of space that must be investigated. Note, however, that the shell does not in general extend much beyond the vessel network; this is the result of replacing the node branch length with the cost function that unfavorably weights paths leading outside of the lumen.

First Embodiment

The present inventors have recognised that this problem with Dijkstra's algorithm can be addressed by a modification. They have appreciated that a medical image three-dimensional volume data set can be considered to be a Euclidean network. In a Euclidean network, pluralities of nodes are connected by branches of known distance. In addition, the absolute spatial position of every node is known, so that the Euclidean distance ("as the crow flies" or shortest straight line distance) between any pair of nodes can be calculated. In the case of the three-dimensional volume data set, the voxels are regularly spaced in an array with known separations between the columns and rows of voxels (depending on the resolution of the imaging system used and any subsequent data processing) so that the Euclidean distance between any pair of voxels (not only adjacent voxels) is known. Incorporating this information into Dijkstra's algorithm provides a significant improvement to the path finding.

Figure 2:
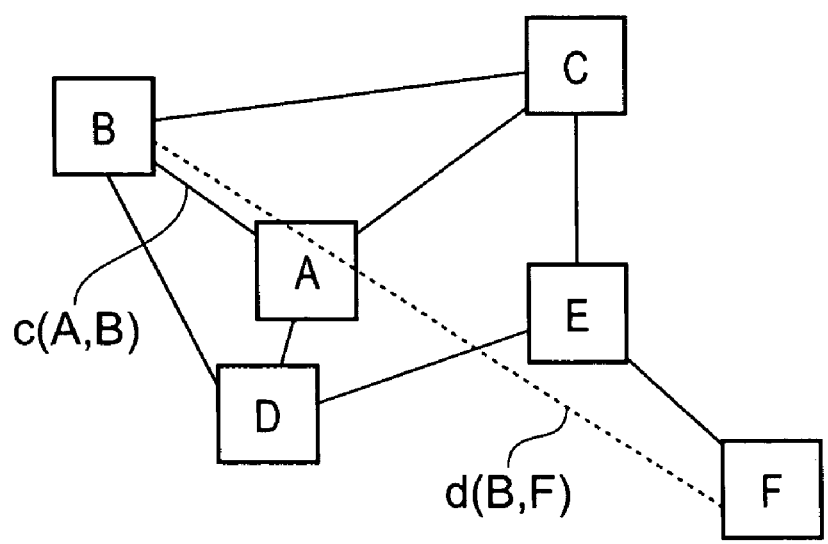
FIG. 2 shows a diagram of an example Euclidean network useful for understanding the present invention.

FIG. 2 shows an example of a Euclidean network, in the form of a road map. This is included by way of analogy to assist in describing the invention. The map shows six towns, A, B, C, D, E and F, these being the nodes of the network. The towns are variously connected by roads (solid lines) of known travelling distance. Also, the spatial position of each town is known so that the Euclidean distance between any two towns can be calculated.

Suppose we want to find the shortest route to travel by road from town A to town F. If at some point in our search we have already found that the shortest path from town A to town B is c(A,B) (corresponding to the road between A and B), we know immediately that any route from town A to town F via town B must be at least c(A,B)+d(B,F), where d(B,F) is the Euclidean distance between B and F (dotted line), because we assume that no road route between two towns can be shorter than the Euclidean distance between the same two towns.

In the standard version of Dijkstra's algorithm, as described above, the nodes are queued for further expansion in priority according to the cumulative cost (path length) so far determined to move from the start point s to those nodes, with the cheapest paths (shortest paths) being first in the queue. This ordering is not just a matter of efficiency, but is essential to obtain a correct result. As discussed, it results in the algorithm expanding in all directions regardless of the desired end point.

The present invention proposes a modification to the expansion priority ordering, made possible by considering the volume data set as a Euclidean network. As in Kanitsar's use of the standard algorithm, the paths between voxels are defined by a cost function c(x,y) to constrain the path to stay inside the lumen of interest. If both the start voxel or node s, and the end voxel or node e are specified within the lumen, the priority given to any intermediate voxel n reached by the algorithm working out from s is defined as the sum of the cumulative cost c of the cheapest path already found from s to n, plus the Euclidean distance d from n to e. That is, voxel n is assigned priority p(n) given by:

$$p(n) = c(s,n) + d(n,e) \quad (1)$$

A voxel n having a low cost path from s (small value of c(s,n)) and which is close to the end voxel e (small value of d(n,e)) will therefore have a low value of p(n). The lowest value of p(n) is allocated as having the highest priority for expansion. Thus, voxels which are already close to the specified end point of the path are given higher priority, which biases the algorithm away from paths leading in the opposite direction. The algorithm considers both the distance from the start point and the distance to the destination, in contrast to the standard algorithm which only considers distance from the start point. The effect of this is that paths likely to lead to the correct result are processed first, reducing the overall amount of computation needed to find the optimum path and hence giving a result more quickly.

Figure 3:
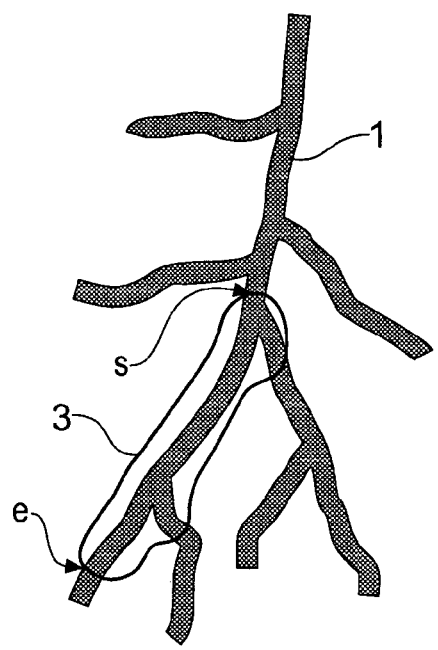
FIG. 3 shows the biological object network of FIG. 1 through which a path has been determined using a method according to an embodiment of the present invention.

FIG. 3 shows the same network of vessels 1 as FIG. 1, through which a path from the start point s to the end point e is required. In this case, the modification to Dijkstra's algorithm gives a much smaller contour 3 of voxels to which paths have been found before a path to s is identified, owing to the fact that the algorithm does not explore paths leading away from s. Hence the computational time is greatly reduced.

In order to implement this modification, it is necessary to ensure that the following condition holds for all pairs of voxels x and y:

$$c(x,y) \geq d(x,y) \quad (2)$$

The Euclidean distance is easily defined for the voxels in the three-dimensional data array, so the above inequality can be satisfied by ensuring that the cost function $f(x,y)$ for a pair of adjacent voxels x and y has a minimum value equal to the Euclidean distance between the centres of these two voxels. Assuming the voxels are equally spaced in columns and in rows, this distance is 1, $\sqrt{2}$ or $\sqrt{3}$ depending on whether the adjacency is along a column or row, diagonally across a square of voxels within a plane, or diagonally from corner to corner of a cube of voxels.

Figure 4:
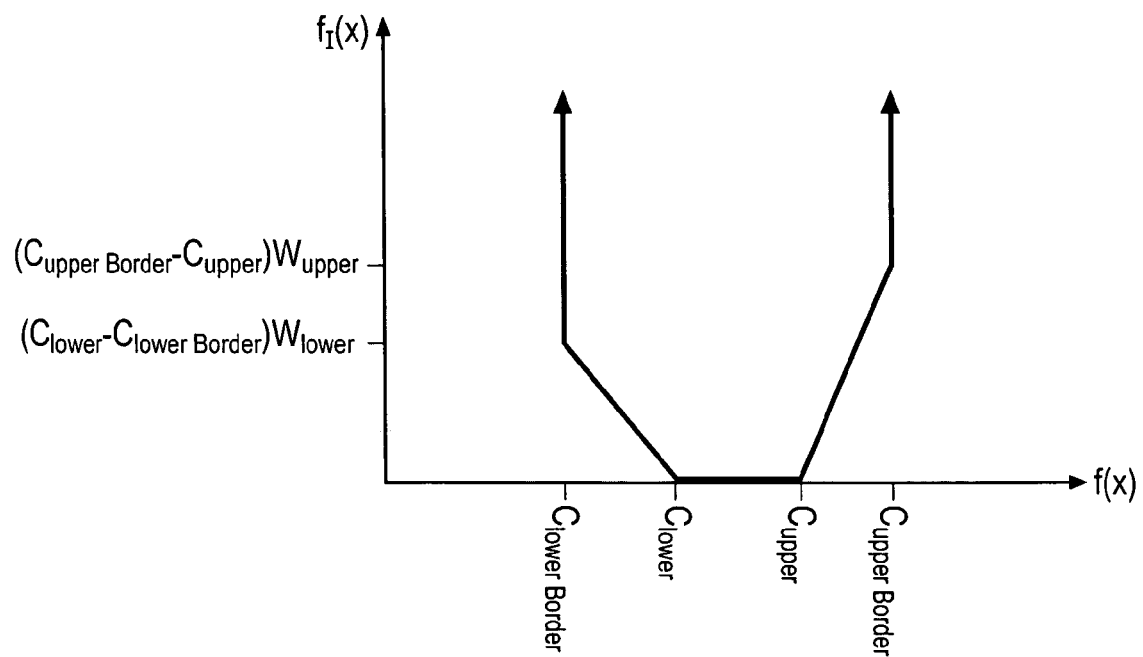
FIG. 4 shows a graphical representation of a cost function suitable for use in embodiments of a lumen path finding algorithm utilized in the present invention.

For example, one may set $$f(x,y) = d(x,y) F(x) \quad (3)$$

where F(x) is a selected cost function, with a minimum value 1.0. This latter constraint is difficult to achieve with the full cost function described by Kanitsar [12, 13]. A simpler cost function may be chosen instead, such as just the density interval function $f_i(x)$ of Kanitsar's cost function, if the voxel values are values of density. FIG. 4 shows a graph of Kanitsar's density interval function. It is defined by an upper threshold $c_{upperBorder}$ and a lower threshold $c_{lowerBorder}$ for the voxel density that define the range of density values belonging to voxels lying within the vessel. For voxels with densities inside this range, the density interval function is zero, and hence contributes nothing to the cost function. For voxels with densities outside this range, the density interval function, and hence the cost function, is set to infinity, so that the algorithm will not select paths leading to these voxels. It is further desirable for the lowest cost path to remain near the center of the lumen. Voxels near the lumen wall will typically have densities at one or other end of the range of lumen voxel densities. This is accommodated in the density interval function by specifying further boundaries $c_{lower}$ and $c_{upper}$ inside the $c_{lowerBorder}$ and $c_{upperBorder}$ range such that the function varies linearly between $c_{lowerBorder}$ and $c_{lower}$ and between $c_{upper}$ and $c_{upperBorder}$. Thus, voxels near the lumen wall contribute more to the cost function than voxels in the lumen center, so that the algorithm is biased towards the center of the lumen. The impact of this can be adjusted using weighting factors $\omega_{lower}$ and $\omega_{upper}$ to alter the slope of the function in these regions. Alternatively, a modified version of the density interval function could be used that omits one or more of the various thresholds and boundaries $c_{lowerBorder}$, $c_{lower}$, $c_{upper}$ and $c_{upperBorder}$.

Modifying Dijkstra's algorithm by using the Euclidean distance to prioritise the nodes for expansion is known as the A* modification [14]. It has previously been used for applications such as segmentation of two-dimensional images, using a semi-automated tool to define the outline of an object within a larger image [15], and in navigational tools such as GPS-based navigational devices and geographical route-finding software. However, the present invention is based on the recognition that the A* modification can be applied to the problem of lumen path finding, once one realises that the three-dimensional volume data set generated by many medical imaging devices can be considered as a Euclidean network. By so doing, the path finding required for stent planning and stenosis sizing and various image processing and medical diagnostic and planning procedures can be greatly improved.

Second Embodimemt

A further improvement to lumen path finding using Dijkstra's algorithm is also proposed. The priority p(n) used in the A* modification (Equation 1) can be written in a more general form as $$p(n) = c(s,n) + k(d(n,e)) \quad (4)$$

where the Euclidean distance is scaled by a factor k. For the A* modification to be valid, k is set to 1. However, the present embodiment also proposes setting k to be greater than 1, k>1. By so doing, the closeness of a voxel n to the destination end voxel is awarded more importance than is theoretically justified. The closer a voxel is to the end point, the more its priority is enhanced.

The effect of this is to introduce an error, in that the path found from s to e is no longer the lowest cost path from s to e, merely a path from s to e. Intuitively, this seems undesirable. Indeed, as the value of k is increased, the cost of the path identified from s to e also increases. However, the inventors have found that at the same time, the computational effort and time required to identify the path is reduced. Most surprisingly, the error in the path is very small compared to the reduction in computational effort. This is considered to be highly beneficial.

Consider the following results obtained for finding paths along objects in two different data sets using different values of k in Equation 4:

TABLE 1

| k | Path cost | Error in cost | Iterations |
|---|---|---|---|
| 0 | 436.08 | 0% | 2,536,794 |
| 1 | 436.08 | 0% | 495,648 |
| 1.1 | 437.13 | 0.2% | 268,614 |
| 1.5 | 444.48 | 1.9% | 8,559 |
| 2.0 | 467.68 | 7.2% | 1,292 |

TABLE 2

| k | Path cost | Error in cost | Iterations |
|---|---|---|---|
| 0 | 1057.23 | 0% | 14,303,393 |
| 1 | 1057.23 | 0% | 150,524 |
| 1.1 | 1062.38 | 0.5% | 119,340 |
| 1.5 | 1096.04 | 3.7% | 950 |
| 2.0 | 1091.08 | 3.2% | 960 |

When k=0, we have Dijkstra's standard algorithm. For k=1, we have the A* modification according to the first embodiment. Note that the A* algorithm delivers a path of identical cost to the standard algorithm (although not necessarily the same path, since there are frequently branches between voxels of identical cost and the one chosen is determined by arbitrary ordering in the algorithm), but uses a much smaller number of iterations to do so. Hence the A* modification reduces processing time, as described above.

However, the behavior as k is increased above 1 is of particular interest. In this regime, the algorithm is theoretically invalid. However, in the case of lumen path finding, we see that for k>1 the error in the path (i.e. the extent to which the path identified is not the lowest cost path possible) is modest, while the further reduction in computation (number of iterations) is dramatic. The actual size of the error and the reduction in the number of iterations varies with each path and each data set, as can be seen from the two examples above. However, it has been found that in general a value of k between about 1.5 and 2 (inclusive) gives an acceptable error in the path combined with an extremely useful reduction in algorithm processing time. Of course, larger values of k can be used, but the further reduction in computation may not be significant enough to be appreciated by a user, while the larger path error may begin to cause problems.

A modest error in the path, say up to about 10%, is not of concern for many applications of the practical task of finding a path along a lumen between two points. The cost function of the algorithm ensures in most cases that any path identified will lie wholly inside the object of interest, and in general this is adequate. The lowest cost path between the two points will not necessarily be more suitable for a particular application than any other path between the same two points. Consequently the vast reduction in processing time offered by setting k>1 is highly advantageous. Fast processing of patient image data is of great importance, since the users of processing systems are generally busy medical personnel who are unable or unwilling to wait even a few minutes for a result. Furthermore, allowing applications such as stent planning and stenosis sizing to function approximately in real time, without processing delays, is beneficial in that the enhanced interaction can lead to faster and more accurate diagnosis and treatment of patient disease.

Third Embodiment

For some lumen path finding applications, in particular stent planning, stenosis sizing and virtual endoscopy, it is necessary or preferable to find the centerline path. This is the path that runs approximately along the geometric longitudinal axis of the lumen. For stent planning and stenosis sizing, a centerline enables accurate measurements to be taken from the anatomical region. In virtual endoscopy, it is desirable that the virtual camera follows the centerline path to avoid the impression to the user that the camera is about to collide with the object wall, and also to give the best possible view of the environment within the lumen to increase the chance that abnormalities are detected.

It is highly unlikely for any practical start and end point for a path in a lumen of interest that the shortest or lowest cost path will be the centerline path, particularly in a highly curved and/or branched network, where the shortest path will tend to hug the object wall around corners. Therefore, neither Dijkstra's standard algorithm nor the A* modification according to the present invention will directly identify the necessary path. Consequently, further processing is then required to refine the identified path towards the centerline, preferably after smoothing of the identified path.

This is of significance for the second embodiment of the present invention, where the modified algorithm finds a path other than the lowest cost path. Given that the lowest cost path will not be the desired centerline path and will need refining, the fact that a different path is found has little effect on the end result, since this different path can be smoothed and centered in the same way as would be necessary for the lowest cost path. Therefore, the error in the path cost introduced by prioritizing the algorithm using k>1 is of little significance and has no drawbacks; the only difference is the advantage resulting from the greatly reduced computational effort, which is greatly appreciated by users.

Smoothing of the path may be done by any line smoothing technique, such as using a cubic spline to interpolate additional points along the path. Similarly, refining of the path to give the centerline path can be achieved using any suitable technique. Many vessel path finding methods have been previously proposed (such as the examples given in the Introduction), and many of these do not find the centerline directly and require refining and/or smoothing.

An example of a path refining technique to find the centerline is to sample images through the data set which are orthogonal to the path found by the algorithm (preferably after smoothing) at intervals along the path. This gives a set of cross-sectional images across the object. For each image, a number of rays or vectors are then cast outwards from the path to the object walls. Assuming that the path is not already centered, these rays will have various lengths. An average length can be calculated, or several average lengths for opposite pairs of rays in different directions across the lumen (to account for deviations from a circular lumen cross-section) and the path repositioned so that the rays have the average length or length. Several iterations of this may be required to give a good result. Once this has been done for every cross-section, the newly determined path positions for each cross section are connected to define the centerline path.

Further Embodiments

The embodiments of the present invention are applicable to any lumen path finding problem for a three-dimensional data set. The term lumen is intended to have wide coverage, and applies generally to any biological hollow tubular object within the human or animal body. The object may be branched, for example, the bronchial network or the circulatory system (aorta, veins, arteries), or non-branched, for example the colon or intestine. Indeed, the invention is also applicable to any path finding problem where a path through a tubular object or network is desired, and where the object is suitable for imaging using a technique that provides a three-dimensional volume data set made up of voxels.

A number of medical applications depend upon determining paths through lumens or vessels imaged in three-dimensional data sets, and the present invention is applicable to all such applications. Path determination for vessel analysis for use in stent planning and stenosis sizing is of particular importance, since it provides an accurate and non-invasive method of measurement. Path finding may also be applied to virtual endoscopy or to determine the precise location of and distance to an operation site (tumor removal, for example), so that a surgeon can plan the operation very precisely. The best incision site can be accurately located, for example. A further important application is curved multi-planar reformatting (MPR), which is an imaging technique used to provide a two-dimensional image of a curved and hence three-dimensional biological object. A path or three-dimensional curve is defined through the three-dimensional data set along the length of the object. The curve is extruded in a desired direction to generate a curtain-like sheet in the three-dimensional volume, and the sheet is then flattened and presented to the user as a two-dimensional image. It is expected that the present invention will be implemented using a computer system with appropriate software, the system comprising a memory to hold the three-dimensional volume data set and the cost function, and a processor programmed with the software and operable to implement the algorithm plus image rendering, scaling, and other image processing and data processing. A monitor is provided to display the data set, once it is rendered as a three dimensional or two-dimensional image (a curved MPR image of an affected vessel or the view presented by a virtual endoscopy camera, for example), as are user input devices such as a keyboard and a mouse. The user may select the start and end points for the desired path using the user input devices, or the software may be able to perform this automatically by identifying the extent of an object of interest according to its characteristic range of voxel values associated with a physical characteristic of the object. Further in this regard, a computer program product may be made available to implement the present invention, comprising instructions readable by a machine such as a computer and operable to instruct the machine to calculate a path in accordance with an embodiment of the invention. The computer program product may have the form of a computer program on a carrier medium, where the carrier medium is a storage medium or a transmission medium.

For use in a hospital environment, a computer system that implements the invention may usefully be integrated with a Picture Archiving and Communication System (PACS). This is a hospital-based computerised system that can store diagnostic images of different types (including three-dimensional volume data sets from CT, MRI, PET and ultrasound) in a digital format organised in a single central archive. Each image has associated patient information such as the name and date of birth of the patient also stored in the archive. The archive is connected to a computer network provided with a number of workstations, so that users all around the hospital site can access and view any image data as needed. Additionally, users remote from the site may be permitted to access the archive over the internet or a wide area network.

In the context of the present invention, therefore, a plurality of volume data sets can by stored in a PACS archive, and a computer-implemented method of determining a path along a biological object with a lumen represented by a volume data set according to embodiments of the invention can be provided on a workstation connected to the archive via a computer network. A user such as a radiologist, a consultant, or a researcher can thereby access any volume data set from the workstation, and generate a path through the data for the purpose of vessel analysis, a virtual endoscopic procedure, MPR image display, or similar. The path processing may be performed on a local processor comprised within the workstation, or on a central processor located elsewhere in the network, that then generates the images and sends them to a monitor of the workstation for display to the user.

Figure 5:
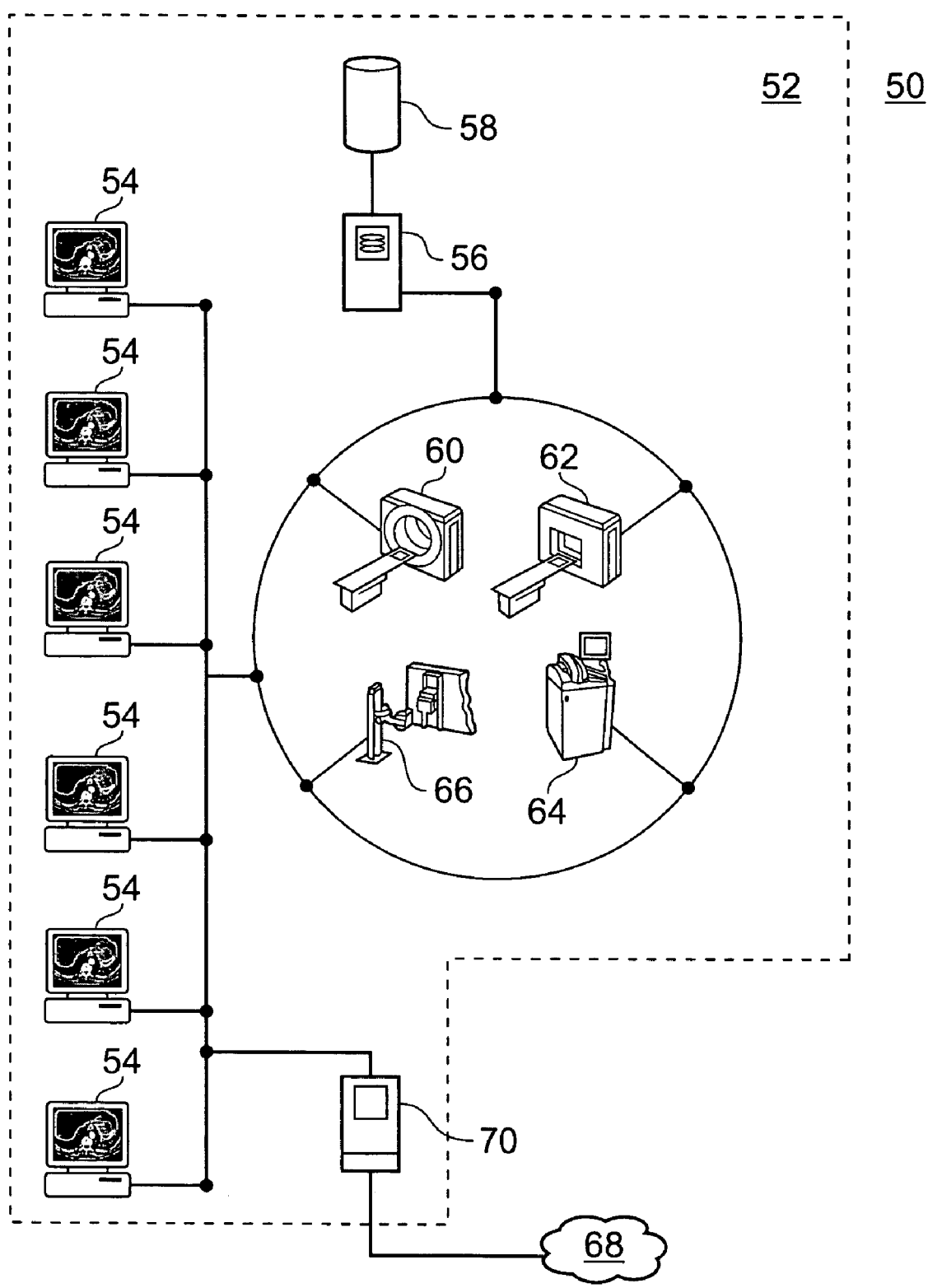
FIG. 5 shows an example computer network that can be used in conjunction with embodiments of the invention.

FIG. 5 shows an example computer network which can be used in conjunction with embodiments of the invention. The network 50 comprises a local area network in a hospital 52. The hospital 52 is equipped with a number of workstations 54 which each have access, via the local area network, to a hospital computer server 56 having an associated storage device (memory) 58. A PACS archive is stored on the storage device 58 so that data in the archive can be accessed from any of the workstations 54. One or more of the workstations 54 has access to software for computer-implementation of methods of path finding as described above. The software may be stored locally at the or each workstation 54, or may be stored remotely and downloaded over the network 50 to a workstation 54 when needed. In another example, methods embodying the invention may be executed on the computer server 56 with the workstations 54 operating as terminals. A number of medical imaging devices 60, 62, 64, 66 are connected to the hospital computer server 56. Volume data collected with the devices 60, 62, 64, 66 can be stored directly into the PACS archive on the storage device 56. Thus a path along an imaged object may be generated immediately after the corresponding volume data set is recorded, so that a swift diagnosis can be obtained in the event of a medical emergency. The local area network 50 is connected to the Internet 68 by a hospital internet server 70, which allows remote access to the PACS archive. This is of use for remote accessing of the data and for transferring data between hospitals, for example, if a patient is moved or to allow external research to be undertaken.

It will be appreciated that although particular embodiments of the invention have been described, many modifications, additions and/or substitutions may be made within the scope of the present invention. Accordingly, the particular examples described are intended to be illustrative only, and not limitative.

REFERENCES

[1] U.S. Pat. No. 5,971,767
[2] U.S. Pat. No. 6,496,188
[3] US 2004/109603
[4] WO 03/058553
[5] U.S. Pat. No. 6,343,936
[6] Robert J. T. Sadleir and Paul F. Whelan, "Colon centerline calculation for CT colonography using optimised 3D topological thinning", 3DPVT 2002—The International Symposium on 3D Data Processing Visualization and Transmission, Padova, Italy, Jun. 19-21, 2002

[7] U.S. Pat. No. 5,611,025
[8] U.S. Pat. No. 6,690,816
[9] US 2004/0209234
[10] US 2005/0033114
[11] E. W. Dijkstra, "A note on two problems in connection with graphs", Numeriche Mathematik, 1:269-271, 1959
[12] A. M. Kanitsar, "Advanced visualisation techniques for vessel investigation", Chapter 5, 40-46, Master's Thesis, Technical University of Vienna, Institute for Computer Graphics and Algorithms, 2001
[13] A. Kanitsar, R. Wegenkittl, P. Felkel, D. Fleischmann, D. Sandner, E. Gröller, "Postprocessing and visualisation of peripheral CTA data in clinical environments", 39-48, Central European Seminar on Computer Graphics for Students, CESG, 2001
[14] R. Sedgewick, "Algorithms in C, Part 5: Graph algorithms", third edition, Chapter 21.5, Addison Wesley Professional, ISBN 0201316633, 2001
[15] E. N. Mortensen and W. A. Barrett, "Interactive segmentation with intelligent scissors", Graphical Models and Image Processing, 60, 349-384, September 1998

What is claimed is:

1. A computer-implemented method of determining a path along a three-dimensional object represented by a three-dimensional volume data set, the data set comprising a plurality of voxels each having a value indicating a characteristic of material represented by the voxel and arranged in a three-dimensional array, the method comprising:
    selecting a path start voxel s and a path end voxel e from voxels lying within the object; and
    determining a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than 1; and
    wherein the minimum cost path finding algorithm is a modified version of Dijkstra's algorithm.

2. The method of claim 1, wherein $1.5 \leq k \leq 2$.

3. The method of claim 1, wherein the priority function p for a voxel n is given by $p(n)=c(s,n)+k(d(n,e))$ where: $c(s,n)$ is the lowest cost for a path from the start voxel s to the voxel n according to a cost function that defines costs for paths between pairs of adjacent voxel; $d(n,e)$ is the Euclidean distance from the voxel n to the end voxel e; $c(s,n) \geq d(n,e)$; and a low value of p corresponds to a high priority.

4. The method of claim 1, wherein the cost function depends on the voxel value and gives a lower cost for a path between a pair of voxels in which both voxels lie within the object, and a higher cost for a path between a pair of voxels in which one or both voxels lie outside the object.

5. The method of claim 1, wherein voxels outside the object are not prioritized for possible selection by the algorithm.

6. The method of claim 1, wherein selecting the intermediate voxels n comprises:
    (i) using the cost function to ascertain costs for paths from the start voxel s to adjacent voxels;
    (ii) prioritizing the voxels to which paths have been costed using the priority function;
    (iii) selecting from the prioritized voxels the voxel with the highest priority;
    (iv) using the cost function to ascertain costs for paths from the start voxel s via the voxel with the highest priority to voxels adjacent to the voxel with the highest priority; and
    (v) repeating (ii) to (iv) until a path is costed from the start voxel s to the end voxel e.

7. The method of claim 1, and further comprising refining the path determined from the start voxel s to the end voxel e towards the longitudinal axis of the object.

8. The method of claim 1, and further comprising smoothing the path determined from the start voxel s to the end voxel e.

9. The method of claim 1, wherein the three-dimensional object is a biological object with a lumen.

10. A computer program product comprising a machine readable storage medium bearing machine executable instructions for implementing a computer-implemented method of determining a path along a three-dimensional object represented by a three-dimensional volume data set, the data set comprising a plurality of voxels each having a value indicating a characteristic of material represented by the voxel and arranged in a three-dimensional array, the instructions being operable to instruct a machine to:
    store a three-dimensional volume data set;
    allow a user to select a path start voxel s and a path end voxel e from voxels lying within the object; and
    determine a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than 1; and
    wherein the minimum cost path finding algorithm is Dijkstra's algorithm.

11. The computer program product of claim 10, wherein the priority function p for a voxel n is given by $p(n)=c(s,n)+k(d(n,e))$ where: $c(s,n)$ is the lowest cost for a path from the start voxel s to the voxel n according to a cost function that defines costs for paths between pairs of adjacent voxel; $d(n,e)$ is the Euclidean distance from the voxel n to the end voxel e; $c(s,n) \geq d(n,e)$; and a low value of p corresponds to a high priority.

12. A computer system for implementing a computer-implemented method of determining a path along a three-dimensional object represented by a three-dimensional volume data set, the data set comprising a plurality of voxels each having a value indicating a characteristic of material represented by the voxel and arranged in a three-dimensional array, the computer system comprising:
    memory for storing a three-dimensional volume data set; and
    a processor programmed to:
        allow a user to select a path start voxel s and a path end voxel e from voxels lying within the object; and
        determine a path from the start voxel s to the end voxel e via one or more intermediate voxels n lying within the object by using a minimum cost path finding algorithm to select the intermediate voxels n, where the algorithm prioritizes voxels for possible selection using a priority function that depends on a cost function that defines costs for paths between voxels, and on the Euclidean distance from a voxel to the end voxel e such that a smaller Euclidean distance gives a greater contribution to priority for that voxel, and the Euclidean distance is weighted by a constant k which is greater than 1; and wherein the minimum cost path finding algorithm is Dijkstra's algorithm.

13. The computer system of claim 12, wherein k>1.

* * * * *